(12) United States Patent
Koger et al.

(10) Patent No.: US 10,997,300 B2
(45) Date of Patent: May 4, 2021

(54) DOUBLE BOOT ENCRYPTION PASSWORD RESTORE

(71) Applicant: AgigA Tech Inc., San Diego, CA (US)

(72) Inventors: Thomas O. Koger, San Diego, CA (US); Torry J. Steed, San Diego, CA (US)

(73) Assignee: AgigA Tech Inc., San Diego, CA (US)

( * ) Notice: Subject to any disclaimer, the term of this patent is extended or adjusted under 35 U.S.C. 154(b) by 225 days.

(21) Appl. No.: 16/372,066

(22) Filed: Apr. 1, 2019

(65) Prior Publication Data

US 2019/0303582 A1 Oct. 3, 2019

Related U.S. Application Data

(60) Provisional application No. 62/650,904, filed on Mar. 30, 2018.

(51) Int. Cl.
| | |
|---|---|
| *G06F 11/14* | (2006.01) |
| *G06F 21/57* | (2013.01) |
| *G06F 21/31* | (2013.01) |
| *G06F 9/4401* | (2018.01) |

(52) U.S. Cl.
CPC .......... *G06F 21/575* (2013.01); *G06F 9/4401* (2013.01); *G06F 11/1469* (2013.01); *G06F 21/31* (2013.01)

(58) Field of Classification Search
CPC ............. G06F 11/1417; G06F 11/1441; G06F 11/1469
See application file for complete search history.

(56) References Cited

U.S. PATENT DOCUMENTS

| | | | |
|---|---|---|---|
| 2019/0056999 A1* | 2/2019 | Foxworth | G06F 21/44 |
| 2019/0129865 A1* | 5/2019 | Fenster | G06F 1/30 |

\* cited by examiner

*Primary Examiner* — Albert Wang

(57) ABSTRACT

A method of restoring an encrypted memory image in a system comprising volatile and non-volatile memory initiates a RESTORE of the image from the non-volatile memory to the volatile memory during a BIOS phase of a boot process for the system. If, during an operating system phase, it is determined that the RESTORE failed due to a password error, a password is written to the non-volatile memory and the BIOS phase of the boot process is reinitiated.

10 Claims, 5 Drawing Sheets

DOUBLE BOOT ENCRYPTION PASSWORD RESTORE

CROSS-REFERENCE TO RELATED APPLICATIONS

This application claims priority and benefit under 35 USC 119(e) to U.S. Application Ser. No. 62/650,904, filed on Mar. 30, 2018, the contents of which are incorporated herein by reference in their entirety.

BACKGROUND

Many modern computer systems include one or more memory modules that include volatile and non-volatile memory elements. This is especially the case for systems executing critical tasks that require high up-time and/or high reliability and data integrity (e.g., mission-critical server systems). Upon a power failure, or upon a command from a host system that includes the memory module, data from the volatile memory may be backed up to the non-volatile memory (a SAVE operation). The memory module may interface to the host system as a Dual Inline Memory Module (DIMM), and because it also includes non-volatile memory, it may be referred to as an NVDIMM.

Due to the intrinsic backup capability of such a memory module, the host system gains the speed and flexibility of volatile memory, with the data security of non-volatile memory. Backed up data is restored by commanding a memory controller internal to the module to copy data from non-volatile memory back to volatile memory (a RESTORE operation). The stored data is referred to herein as an image. The image may be encrypted for security reasons and hence, a password or key may be required to decrypt the image during a RESTORE.

The RESTORE is typically carried out during the computer system's booting process. The system logic that carries out the early stages of the booting process is commonly referred to as boot logic. The lowest-level such logic, which executes first during booting, is called the Basic Input/Output system (BIOS) or the system BIOS. The primary functions of the system BIOS is to initialize important hardware components and to load the operating system. In addition, the BIOS loads and initializes important system management functions, such as power and thermal management. The system BIOS may also load CPU microcode patches during the boot process. There are several different types of BIOS logic in common use today. Some computers use a conventional BIOS, while many newer systems use boot logic based on the Unified Extensible Firmware Interface (UEFI) specifications. Herein all types of boot logic are referred to simply as "BIOS" or "system BIOS". Specific differences between UEFI and conventional BIOS are noted where appropriate.

A problem arises due to the fact that passwords/decryption keys are not stored during a SAVE, for security reasons. It may thus not be possible to RESTORE an encrypted image during a subsequent boot of the computer system, resulting in lost data.

BRIEF SUMMARY

A process is disclosed to enable an encrypted image stored in an NVDIMM or other non-volatile memory to be successfully RESTORED during the boot phase of a computer system. The process implements a reboot sequence under certain conditions, cycling the system so that a subsequent boot succeeds in restoring the encrypted image.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"Encrypted memory image" refers to an image (literal copy) of the contents of memory, encrypted with a key derived from a password.

"BIOS phase" refers to the actions carried out by the system BIOS during the early stages of booting. The BIOS phase generally refers to booting actions taken up to the point of passing control to the operating system.

"Operating system phase" refers to the phase of booting following the BIOS phase, when the operating system takes over control of the system.

Figure 1:
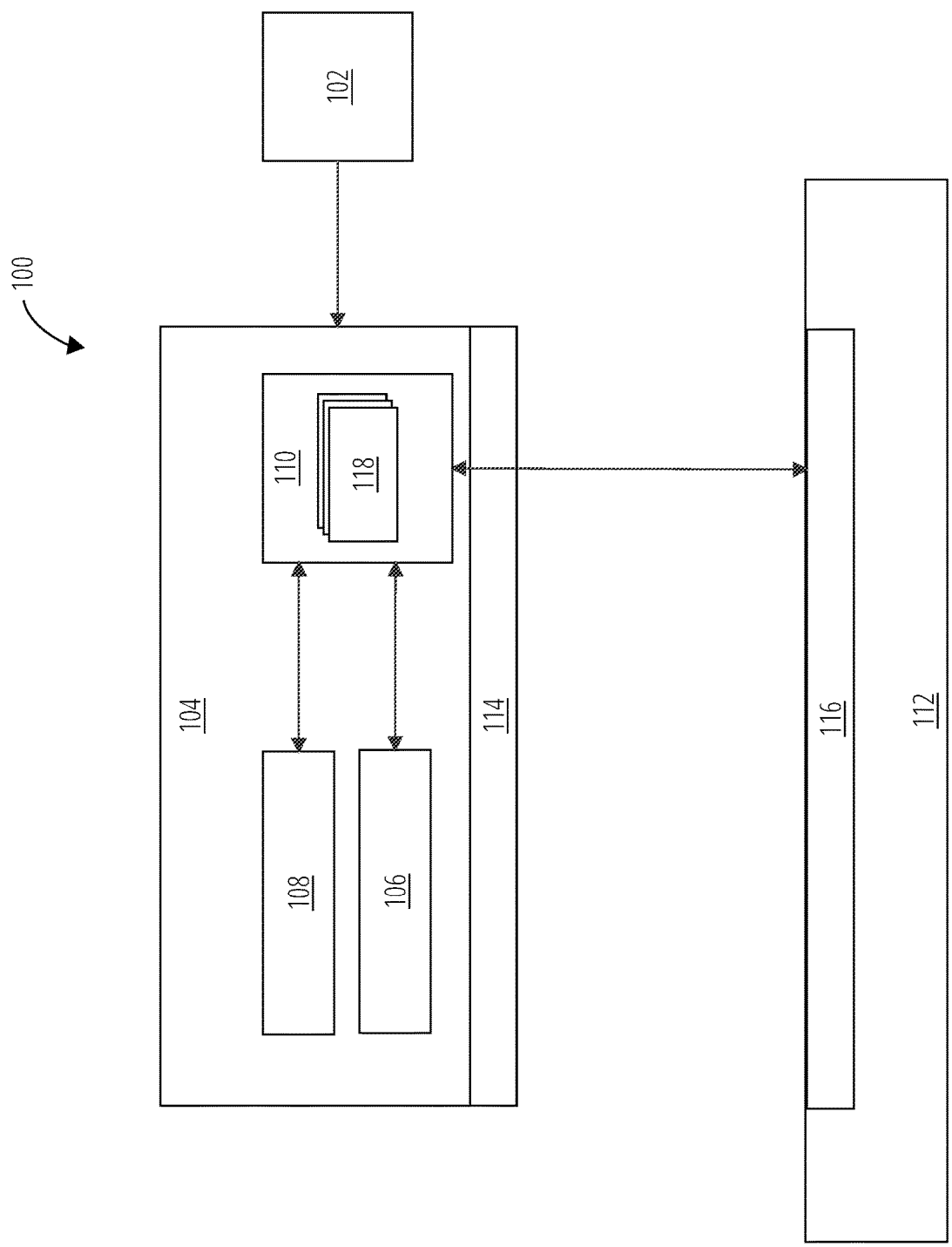
FIG. 1 illustrates a memory system 100 in accordance with one embodiment.

FIG. 1 illustrates a memory system 100 in accordance with one embodiment. The memory system 100 comprises a pluggable subsystem 104 that includes a volatile memory 106, a non-volatile memory 108, and a controller 110. The controller 110 comprises control registers 118. The pluggable sub-system 104 is operated from a power source 102 such as one or more battery, capacitor, or hybrid battery/capacitor source.

The pluggable sub-system 104 is installed into a host system 112. The pluggable sub-system 104 and host system 112 interact via a DIMM connector 114 and a DIMM slot 116. The host system 112 applies a SAVE signal to the controller 110 of the pluggable subsystem 104 via the DIMM connector 114 pins in the DIMM slot 116, initiating a SAVE (backup) of data stored in the volatile memory 106 to independent SAVE regions (e.g., banks) of the non-volatile memory 108. Although SDRAM and NAND Flash are shown for the memory technologies, other memory types or subtypes known in the art may be utilized for these memory components.

The controller 110 may execute a SAVE operation as configured by the control registers 118, resulting in an image of the contents of the volatile memory 106 in the non-volatile memory 108 that can be restored via a RESTORE operation the next time the host system 112 is rebooted.

Figure 2:
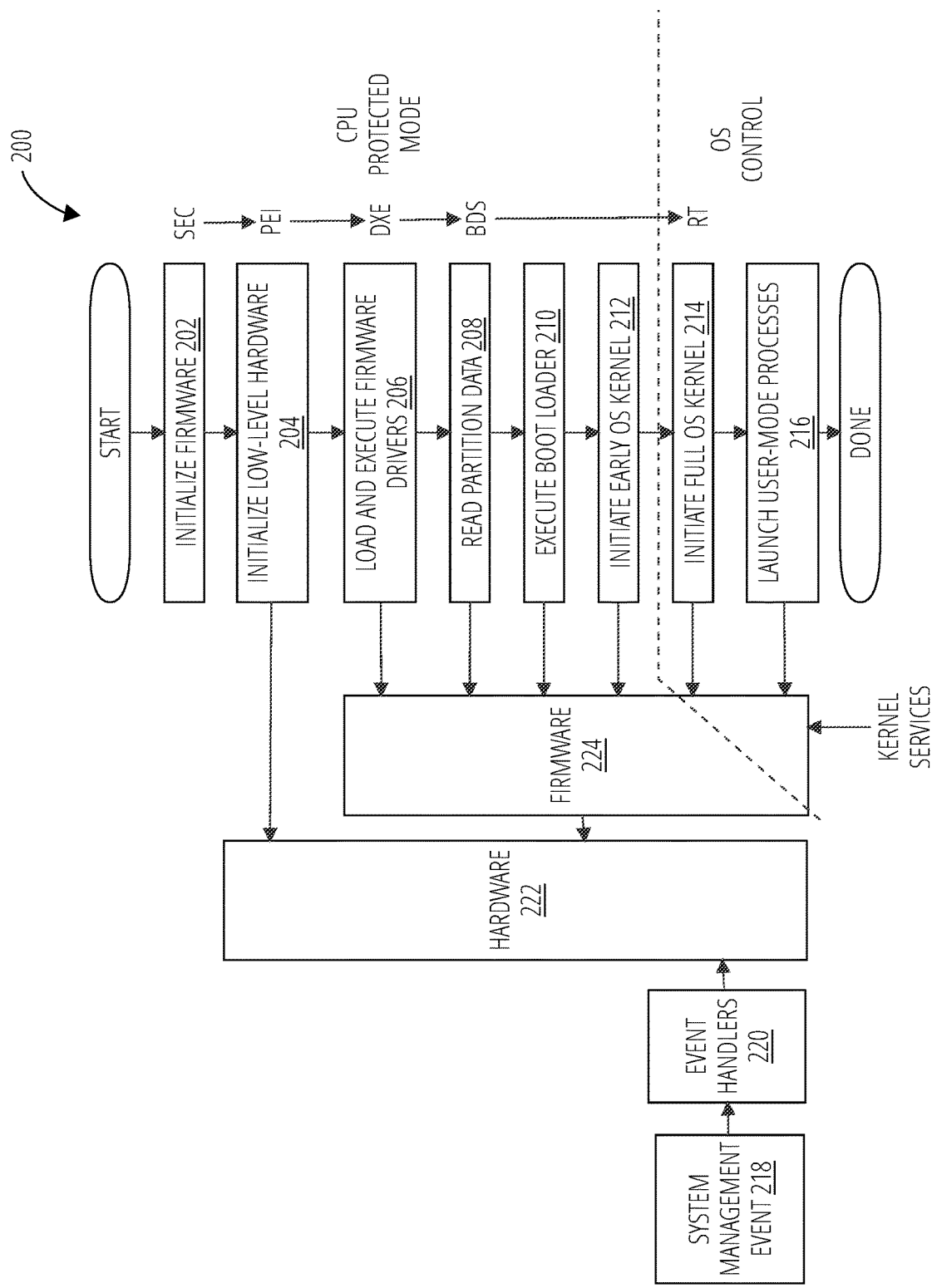
FIG. 2 illustrates a UEFI boot process 200 in accordance with one embodiment.

Referring to FIG. 2, during a typical UEFI boot process 200 (BIOS boot processes are similar in most ways), the system's firmware 224 and low-level hardware 222 are first initialized (block 202, block 204). This involves initializing and testing components such as the motherboard, chipset, memory and CPU. Block 202 is also referred to as the SEC phase and is discussed further below. Block 204 is referred to as the Pre-EFI Initialization (PEI) Phase. The purpose of the PEI Phase is to prepare the system for the Driver Execution Environment (DXE) phase (block 206).

Next, the BIOS executes additional logic (block 206) that either extend the capabilities of the system BIOS or initialize other hardware components necessary for booting the system. This logic may be stored within the same flash memory as the system BIOS or they may be stored in the hardware devices they initialize (e.g., video card, local area network card). This is called the DXE phase and is where most system initialization is performed. The logic executed in this phase is responsible for searching for and executing drivers that provide device support during the boot process, or provide additional features. During this phase the UEFI BIOS may execute conventional option ROMs, which have a similar purpose.

The PEI and DXE phases of the boot process lay the foundation to load an operating system.

Next, the BIOS searches for a boot device (e.g., hard drive, optical drive, USB drive) and executes the boot loader stored on that device. This involves reading storage partition data for the location of the boot loader (block 208) and executing the boot loader (block 210).

The final tasks necessary to load an operating system are performed in the boot Device Selection (BDS) phase. The BIOS boot loader begins to load and initialize the operating system kernel (block 212). Once the kernel is functional, primary control of the computer system transfers from the system BIOS to the operating system (block 214) and user-mode applications begin to load and execute (block 216). This phase initializes console devices for simple input/output operations on the system. These console devices include local text or graphical interfaces, as well as remote interfaces, such as Telnet or remote displays over HTTP. The BDS phase also loads any additional drivers necessary to manage console or boot devices. Finally, the BIOS loads the boot loader from the first MBR (master boot record) or GUID (globally unique ID) Partition Table (GPT) formatted boot device, and loads the operating system to being the run-time phase (RT). The RT phase of the boot process begins when the operating system is ready to take control from the BIOS. BIOS runtime services are available to the operating system during this phase.

The BIOS also loads event handlers 220 so that the system can execute management functions/events such as power and thermal management (system management event 218).

One difference between a UEFI boot process 200 and a conventional BIOS boot process is that UEFI logic executes in 32- or 64-bit protected mode on the CPU, not in 16-bit real mode as is often the case with conventional BIOS. Most UEFI-based platforms begin the booting process with a small core block of code that has the primary responsibility of authenticating subsequent code executed on the computer system. This is very similar to the role of the boot block in conventional BIOS. This part of the boot process is known as the Security (SEC) phase, and it serves as the core root of trust in the computer system. It is during this phase (block 202) that a RESTORE of a SAVED memory image occurs, and requires (if the image is encrypted) a password or key to successfully decrypt and RESTORE the image. In conventional BIOS systems, the RESTORE would typically take place at a similar early phase of the boot process.

Figure 3:
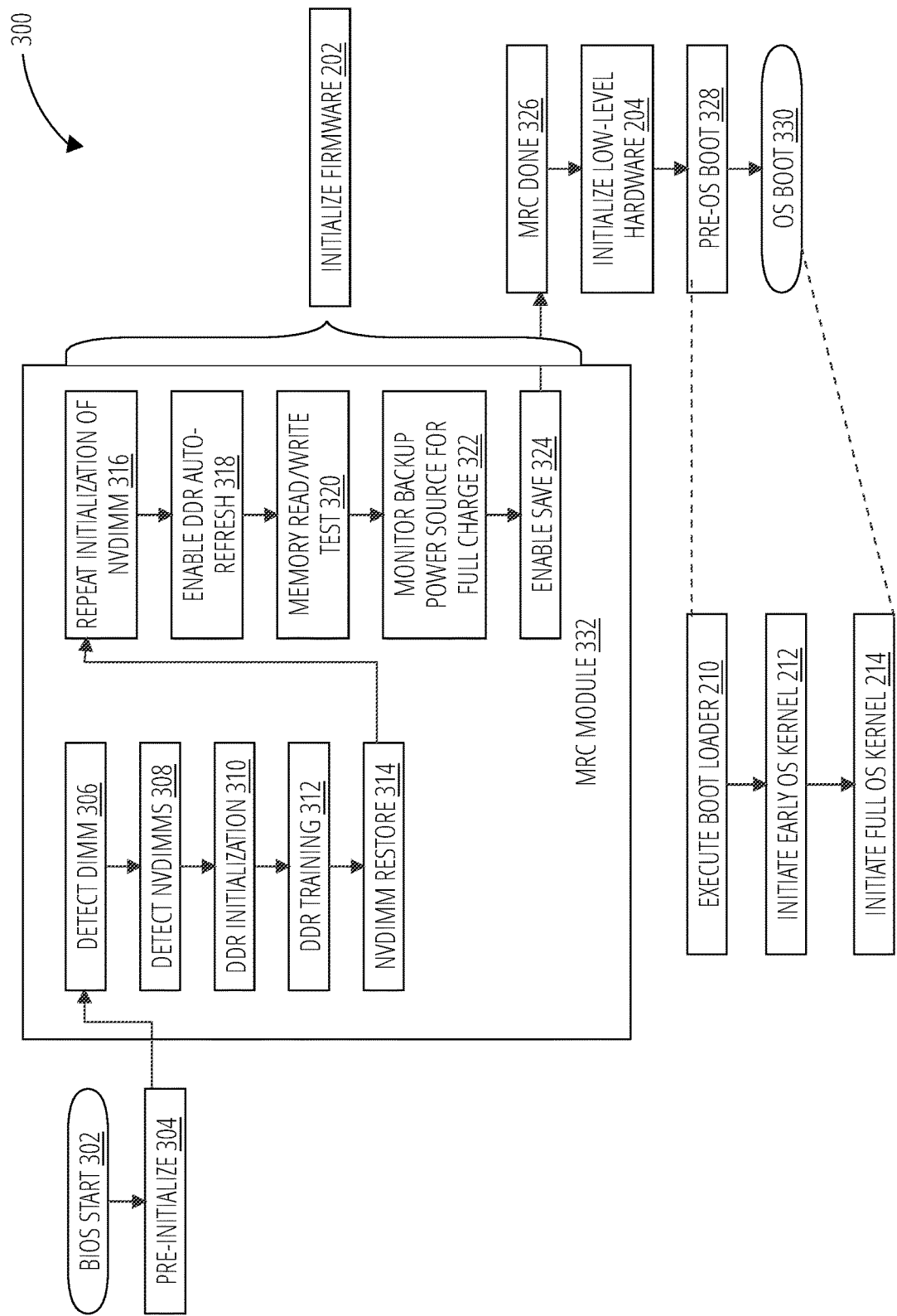
FIG. 3 illustrates a system boot sequence 300 in accordance with one embodiment.

FIG. 3 illustrates an embodiment of a system boot sequence 300 in accordance with one embodiment. The BIOS is started (done block 302) and some pre-initialization (e.g., of memory) is performed (block 304) at the start of the PEI phase.

Next, certain steps are taken in the boot process, which may be recycled if the RESTORE fails due to a password/key issue. These steps collectively occur in a logical functional group called the Memory Reference Code module (MRC module 332).

The MRC module 332 first detects that the DIMM connector 114 is engaged with the DIMM slot 116 (block 306), and if so, detects the non-volatile memory 108 on the DIMM (block 308). For example, the MRC module 332 may read an I2C EEPROM on the DIMM to determine the types of memory on the DIMM (e.g. type of RAM, whether non-volatile memory is present, and what type). Upon successful completion of those actions, the MRC module 332 next performs initialization (block 310) of any DDR (Dynamic Data Rate) volatile memory on the NVDIMM (e.g., volatile memory 106) and performs DDR training (block 312). DDR training may involve the memory controller writing and reading known patterns to and from the memory, and varying the data strobe associated with each four bit or eight bit segment of the memory so that it can precisely tune the strobe timing. This is necessary as the transmission line delays associated with the board traces and connectors has an impact at the 2-4 gigahertz transfer rates.

At this point the NVDIMM RESTORE is carried out (block 314) from the non-volatile memory 108 to the volatile memory 106. If the system cannot access the decryption password or key for an encrypted image in the non-volatile memory 108, or if the password/key is incorrect, the RESTORE will fail. After the RESTORE, the NVDIMM is reinitialized (block 316). For re-initialization the mode registers of the NVDIMM controller are reprogrammed with host-specific values.

The DDR auto-refresh function is now enabled (block 318) and a memory read/write test is performed (block 320). If the NVDIMM does not support encryption during SAVE, the backup power source (e.g., power source 102) is monitored (block 322) to ensure it is sufficiently charged in the event of a power failure, so that there is sufficient energy stored to power a full SAVE operation in that instance. When there's sufficient stored power, the SAVE operation is enabled (block 324), the MRC module 332 concludes its processing (block 326), and the subsequent boot sequence operations as described in conjunction with FIG. 2 are carried out for the pre-OS boot sequence (block 328) and the OS boot sequence (block 330).

Note that the functions of the MRC module 332 may, in a preferred mode, be implemented during the firmware initialization phase (block 202).

Figure 4:
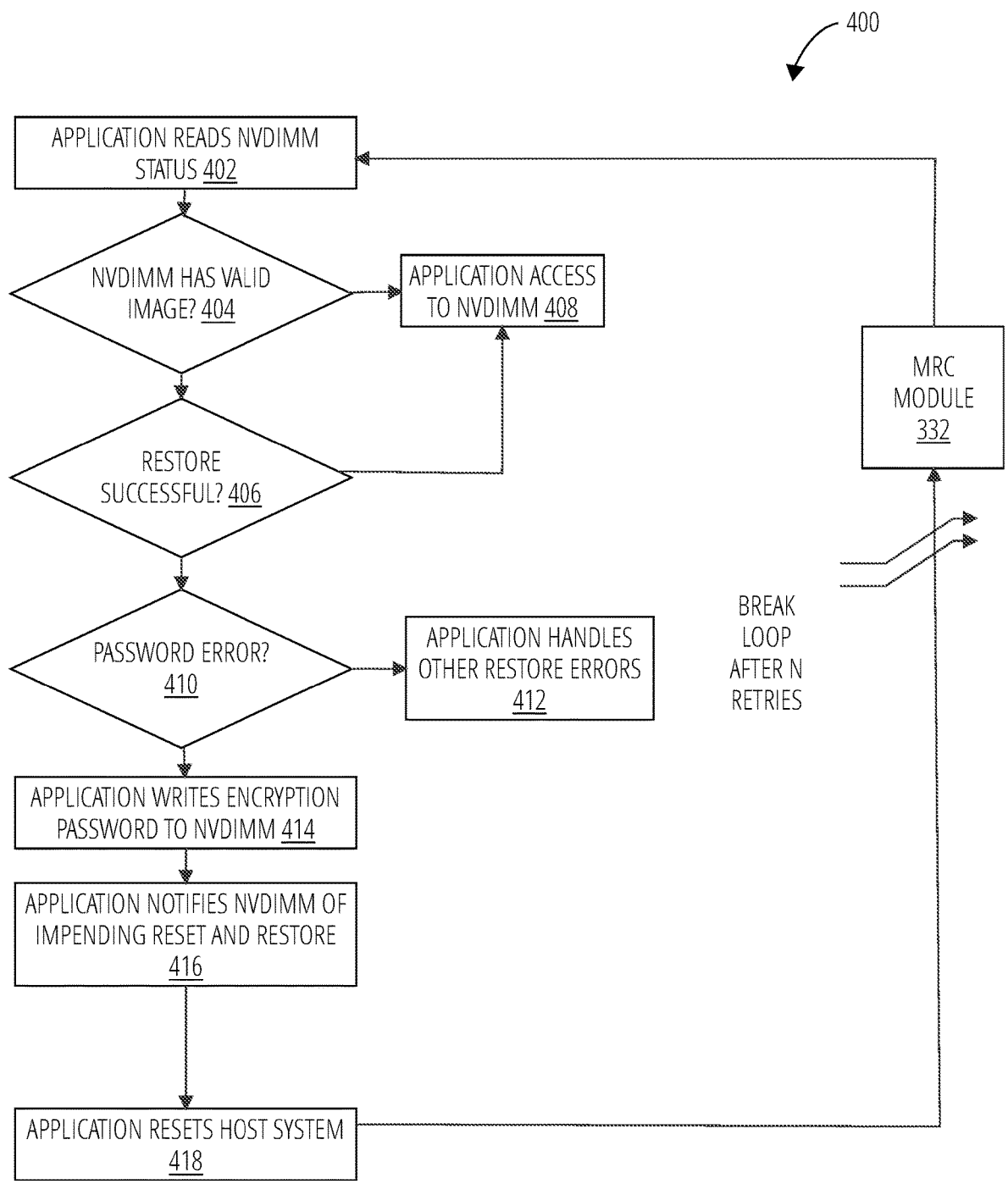
FIG. 4 illustrates a RESTORE process 400 in accordance with one embodiment.

Referring to the RESTORE process 400 of FIG. 4, an application reads the status of the NVDIMM (block 402) and checks if there's a valid memory image stored there (decision block 404). If not, there's no RESTORE to do and the application accesses the NVDIMM as needed (block 408). If there's an image, the application checks if it was successfully RESTORED (decision block 406) at an early stage of the boot process. Again, if the RESTORE did occur earlier with success, the application can access the NVDIMMs as needed.

However, if the earlier RESTORE attempt did not succeed, it may be due to a password error (decision block 410). If the error wasn't due to a password problem, the application deals with the error as appropriate (block 412). Otherwise, a reboot process is initiated.

For the reboot process, the application writes a password to the NVDIMM (block 414). This password unlocks the encryption on the memory image stored there. The application notifies the NVDIMM that a RESET and RESTORE are imminent (block 416) and then resets the host system in which the NVDIMM is installed (block 418).

The MRC module 332 is then activated as per FIG. 3 and the system boot sequence 300 is undertaken again. To avoid being caught in an infinite loop, the reboot process may break the cycle after a preset number of iterations, indicating the password error cannot be overcome by recycling the boot sequence.

Figure 5:
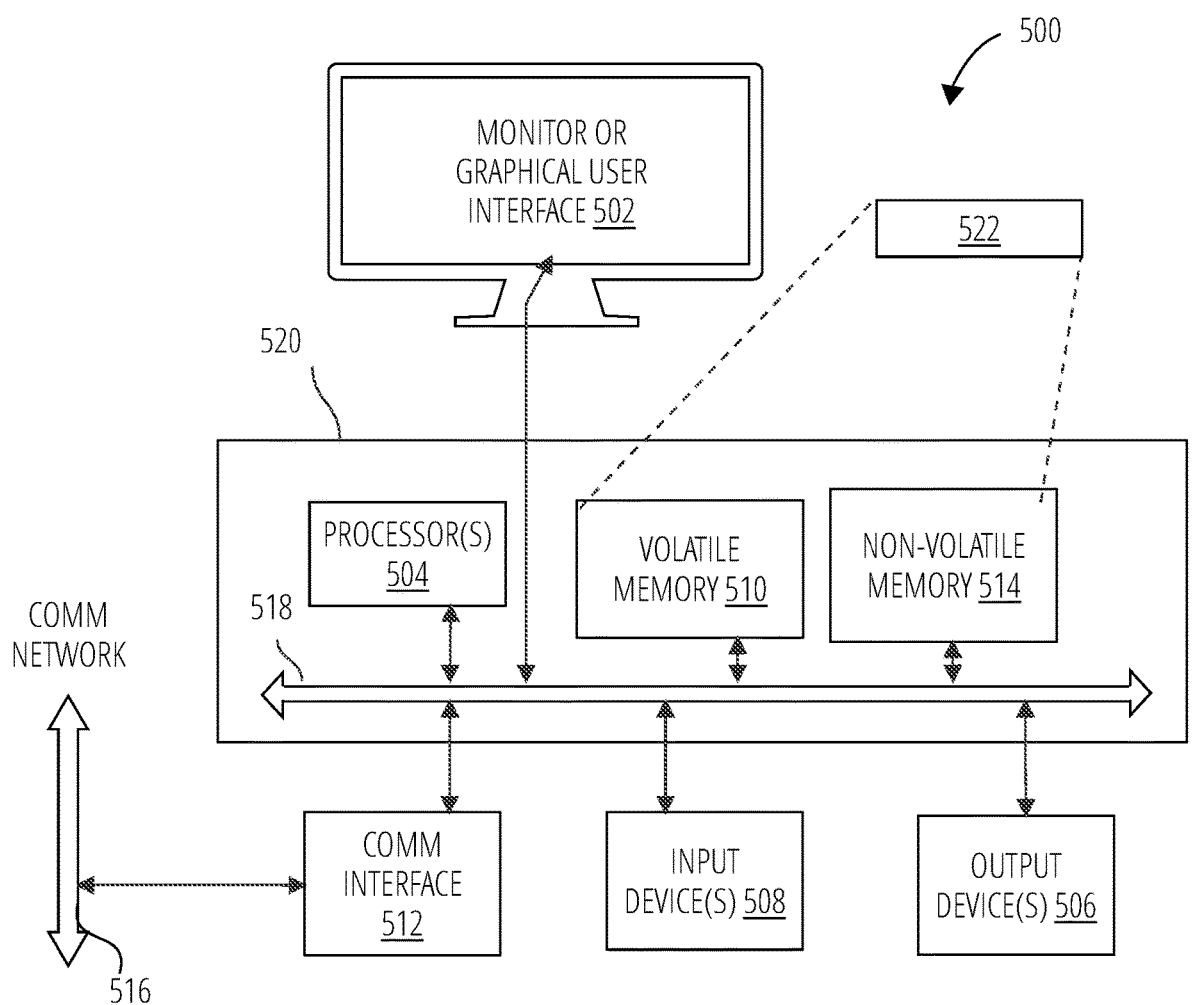
FIG. 5 is an example block diagram of a computing device 500 that may incorporate embodiments of the present invention.

FIG. 5 is an example block diagram of a computing device 500 that may incorporate the pluggable sub-system 104 (e.g., for all or portions of the non-volatile memory 514 and the volatile memory 510) and carry out aspects of the disclosed processes. FIG. 5 is merely an example and one of ordinary skill in the art would recognize other variations, modifications, and alternatives. In one embodiment, the computing device 500 typically includes a monitor or graphical user interface 502, a data processing system 520, a communication network interface 512, input device(s) 508, output device(s) 506, and the like.

As depicted in FIG. 5, the data processing system 520 may include one or more processor(s) 504 that communicate with a number of peripheral devices via a bus subsystem 518. These peripheral devices may include input device(s) 508, output device(s) 506, communication network interface 512, and a storage subsystem, such as a volatile memory 510 and a non-volatile memory 514.

The volatile memory 510 and/or the non-volatile memory 514 may store computer-executable instructions and thus forming logic 522 that when applied to and executed by the processor(s) 504 may implement aspects of the processes disclosed herein.

The input device(s) 508 include devices and mechanisms for inputting information to the data processing system 520. These may include a keyboard, a keypad, a touch screen incorporated into the monitor or graphical user interface 502, audio input devices such as voice recognition systems, microphones, and other types of input devices. In various embodiments, the input device(s) 508 may be embodied as a computer mouse, a trackball, a track pad, a joystick, wireless remote, drawing tablet, voice command system, eye tracking system, and the like. The input device(s) 508 typically allow a user to select objects, icons, control areas, text and the like that appear on the monitor or graphical user interface 502 via a command such as a click of a button or the like.

The output device(s) 506 include devices and mechanisms for outputting information from the data processing system 520. These may include the monitor or graphical user interface 502, speakers, printers, infrared LEDs, and so on as well understood in the art.

The communication network interface 512 provides an interface to communication networks (e.g., communication network 516) and devices external to the data processing system 520. The communication network interface 512 may serve as an interface for receiving data from and transmitting data to other systems. Embodiments of the communication network interface 512 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like.

The communication network interface 512 may be coupled to the communication network 516 via an antenna, a cable, or the like. In some embodiments, the communication network interface 512 may be physically integrated on a circuit board of the data processing system 520, or in some cases may be implemented in software or firmware, such as "soft modems", or the like.

The computing device 500 may include logic that enables communications over a network using protocols such as HTTP, TCP/IP, RTP/RTSP, IPX, UDP and the like.

The volatile memory 510 and the non-volatile memory 514 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 510 and the non-volatile memory 514 may be configured to store the basic programming and data constructs that provide the functionality of the disclosed processes and other embodiments thereof that fall within the scope of the present invention.

Logic 522 that implements embodiments of the disclosed processes may be stored in the volatile memory 510 and/or the non-volatile memory 514, portions or all of which may be incorporated via a pluggable dual inline memory module. Said logic 522 may be read from the volatile memory 510 and/or non-volatile memory 514 and executed by the processor(s) 504. The volatile memory 510 and the non-volatile memory 514 may also provide a repository for storing data used by the logic 522.

The volatile memory 510 and the non-volatile memory 514 may include a number of memories including a main random access memory (RAM) for storage of instructions and data during program execution and a read only memory (ROM) in which read-only non-transitory instructions are stored. The volatile memory 510 and the non-volatile memory 514 may include a file storage subsystem providing persistent (non-volatile) storage for program and data files. The volatile memory 510 and the non-volatile memory 514 may include removable storage systems, such as removable flash memory.

The bus subsystem 518 provides a mechanism for enabling the various components and subsystems of data processing system 520 communicate with each other as intended. Although the communication network interface 512 is depicted schematically as a single bus, some embodiments of the bus subsystem 518 may utilize multiple distinct busses.

It will be readily apparent to one of ordinary skill in the art that the computing device 500 may be a device such as a smartphone, a desktop computer, a laptop computer, a rack-mounted computer system, a computer server, or a tablet computer device. As commonly known in the art, the computing device 500 may be implemented as a collection of multiple networked computing devices. Further, the computing device 500 will typically include operating system logic (not illustrated) the types and nature of which are well known in the art.

The term "logic" herein refers to machine memory circuits, non-transitory machine-readable media, and/or circuitry that by way of its material and/or material-energy configuration comprises control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions are examples of logic. Logic specifically excludes pure signals or software per se (however does not exclude machine memories comprising software and thereby forming configurations of matter).

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of restoring an encrypted memory image in a system comprising volatile memory and non-volatile memory, the method comprising:
   initiating a RESTORE of the encrypted memory image from the non-volatile memory to the volatile memory during a BIOS phase of a boot process for the system;
   during an operating system phase, checking if the RESTORE failed due to a password error for restoring the encrypted memory image; and
   on condition that the RESTORE failed due to the password error, writing a password to the non-volatile memory and re-initiating the BIOS phase of the boot process.

2. The method of claim 1, further comprising re-initiating the BIOS phase by resetting the system.

3. The method of claim 1, wherein the volatile memory and the non-volatile memory are comprised by a pluggable dual inline memory module of the system.

4. The method of claim 1, further comprising:
   breaking a retry loop for restoring the encrypted memory image, on condition that restoring fails a preset number of times.

5. The method of claim 1, further comprising:
   accessing the password to decrypt the encrypted memory image during a second or higher attempt of the boot process.

6. A system comprising:
   a pluggable dual inline memory module comprising:
      a volatile memory; and
      a non-volatile memory; and
   logic to:
      initiate a RESTORE of an encrypted memory image from the non-volatile memory to the volatile memory during a BIOS phase of a boot process for the system;
      during an operating system phase, check if the RESTORE failed due to a password error for restoring the encrypted memory image; and
      on condition that the RESTORE failed due to the password error, write a password to the non-volatile memory and re-initiate the BIOS phase of the boot process.

7. The system of claim 6, further comprising logic to derive from the password a key for decrypting the encrypted memory image.

8. The system of claim 6, further comprising re-initiating the BIOS phase by resetting the system.

9. The system of claim 6, further comprising:
   breaking a retry loop for restoring the encrypted memory image, on condition that restoring fails a preset number of times.

10. The system of claim 6, further comprising:
   accessing the password to decrypt the encrypted memory image during a second or higher attempt of the boot process.

* * * * *